US00RE38415E

(19) United States
(12) Reissued Patent
Weider et al.

(10) Patent Number: US RE38,415 E
(45) Date of Reissued Patent: Feb. 3, 2004

(54) USE OF N-(AMINOALKYL) PYRROLIDINES AS CATALYSTS FOR THE POLYISOCYANATE POLYADDITION PROCESS

(75) Inventors: Richard Weider, Leverkusen (DE); Uwe Scholz, Cologne (DE)

(73) Assignee: Bayer Aktiengesellschaft, Leverkusen (DE)

(21) Appl. No.: 10/267,119

(22) Filed: Oct. 7, 2002

Related U.S. Patent Documents

Reissue of:
(64) Patent No.: 5,134,217
Issued: Jul. 28, 1992
Appl. No.: 07/817,240
Filed: Jan. 6, 1992

(30) Foreign Application Priority Data

Jan. 12, 1991 (DE) ..... 4100811

(51) Int. Cl.[7] ..... C08G 18/08; C08G 18/18; C08J 9/00
(52) U.S. Cl. ..... 528/53; 528/129; 521/129
(58) Field of Search ..... 528/53, 129

(56) References Cited

U.S. PATENT DOCUMENTS 3,888,831 A * 6/1975 Kogen
3,963,680 A * 6/1976 O'Keefe et al.
4,251,637 A * 2/1981 McIntire et al.
4,292,411 A * 9/1981 Jourquin et al.
4,379,861 A * 4/1983 Haas et al.

FOREIGN PATENT DOCUMENTS

GB 1338275 * 11/1973

* cited by examiner

*Primary Examiner*—Morton Foelak
(74) *Attorney, Agent, or Firm*—Joseph C. Gil; Lyndanne M. Whalen; N. Denise Brown

(57) ABSTRACT

The present invention relates to a process for preparing polyisocyanate polyaddition products by reacting (a) polyisocyanates with
(b) relatively high molecular weight compounds containing at least two isocyanate-reactive hydrogen atoms and
(c) chain-extending agents, in the presence of
(d) N-(aminoalkyl)pyrrolidine catalysts corresponding to formula (I)

(I)

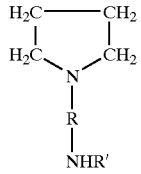

in which

R is a $C_{2-12}$ alkylene group (optionally containing O or N atoms but not isocyanate-reactive groups) and R' is hydrogen or a $C_{1-4}$ alkyl group, (e) optionally, other known catalysts, and
(f) other known additives.

4 Claims, No Drawings

USE OF N-(AMINOALKYL) PYRROLIDINES AS CATALYSTS FOR THE POLYISOCYANATE POLYADDITION PROCESS

Matter enclosed in heavy brackets [ ] appears in the original patent but forms no part of this reissue specification; matter printed in italics indicates the additions made by reissue.

BACKGROUND OF THE INVENTION

This invention relates to the use of N-(aminoalkyl) pyrrolidines as catalysts for the preparation of products by the polyisocyanate addition process. These catalysts may be used as a replacement for or in combination with known urethane catalysts, such as 1,4-diazabicyclo[2.2.2]octane (DABCO), for the preparation of rigid or flexible polyurethane foams and other polyurethane products. In the context of the present invention, the term "polyurethane products" is intended to encompass all reaction products of polyisocyanates with compounds containing at least two isocyanate-reactive hydrogen atoms. That is, the term "polyurethane" is understood to encompass, for example, pure polyurethanes, polyurethane polyureas, or pure polyureas.

The rate of the reaction between isocyanate groups and compounds containing NCO-reactive hydrogen atoms is determined not only by the temperature of the starting products and their structure but particularly by the use of suitable catalysts. In practice, bases (for example, tertiary amines such as triethylamine) are used mainly as nucleophilic catalysts, whereas organometallic compounds (for example, tin carboxylates such as tin(II) octoate) are used mainly as electrophilic catalysts. The prior art processes are based on the joint use of Lewis acids and Lewis bases, which is normally characterized by synergistic effects. However, it is also known that amines are exclusively used as catalysts in a number of applications. However, only a few of the large number of known amine catalysts (cf. Ullmann, 4th Edition, and Kunststoffhandbuch, Vol. VII, Polyurethane, Hanser-Verlag, Munich (1983)) have hitherto been adopted for use on a wide scale, with 1,4-diazabicyclo[2.2.2]octane (DABCO), bis(2-dimethylaminoethyl) ether, triethylamine, dimethyl cyclohexylamine, dimethylethanolamine, dimethylbenzylamine, methylmorpholine, and ethylmorpholine being the most important. More particularly, of course, catalysts distinguished by high activity, economic production, and a broad range of applications are used. Another increasingly important consideration is the toxicological evaluation of the catalysts with regard to processing safety and odor emission. Many of the amine catalysts in use today, such as DABCO or triethylamine, may be regarded as unsatisfactory in this respect because of their high volatility and the relatively intensive amine odor that is carried over into the end product produced with such catalysts.

Amine catalysts containing an additional, isocyanate reactive group corresponding to the general formula

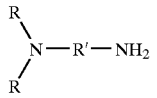

are described in German Offenlegungsschrift 2,116,535, which also mentions, inter alia, compounds in which the two substituents R are attached to each other to form 3- to 6-membered rings. The use of one representative member of this special class of compounds, namely N-(2-aminoethyl) aziridine, is illustrated by Examples 10 and 16–18 of the German patent. In the Examples mentioned, this compound proved to be distinctly poorer than the corresponding acyclic compounds with regard to the density, strength, and elasticity of the foams prepared (Example 10) and particularly with regard to activity (Examples 16 to 18).

It has now surprisingly been found that certain pyrrolidine derivatives may be used advantageously as catalysts for the preparation of polyurethanes. Compared with the above-mentioned N-(2-aminoethyl)aziridine and cyclic compounds other than those having 5-membered rings, the compounds used in accordance with the invention have considerably greater activity that even surpasses that of the acyclic members disclosed in the above-cited German patent specification. Another advantage is the faint odor and low volatility of compounds in which the isocyanate-reactive groups are bound in the polymer, which leads to distinctly reduced odor emission in the preparation of polyurethane products. In addition, other advantages have been observed, including, for example, ease of handling (because the pyrrolidines preferably used are liquid), good curing behavior, and, not least, the very simple preparation of the compounds.

SUMMARY OF THE INVENTION

According to the present invention relates to a process for preparing polyisocyanate polyaddition products comprising reacting (a) polyisocyanates with (b) relatively high molecular weight compounds containing at least two isocyanate-reactive hydrogen atoms and (c) chain-extending agents, in the presence of (d) N-(aminoalkyl)pyrrolidine catalysts corresponding to formula (1)

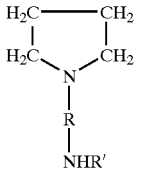

(I)

in which

R is a $C_{2-12}$ alkylene group (optionally containing O or N atoms but not isocyanate-reactive groups) and R' is hydrogen or a $C_{1-4}$ alkyl group, (e) optionally, other known catalysts, and (f) other known additives.

DETAILED DESCRIPTION OF THE INVENTION

The polyisocyanate reaction products prepared according to the present invention are preferably cellular plastics.

The catalysts used according to the invention are known compounds. The preferred catalysts are prepared, for example, by addition of pyrrolidine onto acrylonitrile, followed by reduction and, optionally, subsequent alkylation by known methods. The catalysts according to the invention are colorless to pale yellowish compounds, the preferred types being liquid, and are soluble in organic solvents and soluble or dispersible in water. The quantity of the catalysts is generally from about 0.01 to about 5% by weight, based on the isocyanate-reactive compound. Although more than the above-mentioned quantity may be used, no advantage is gained.

Preferred compounds are catalysts corresponding to general formula (I) in which R is a 1,3-propylene group and R' is hydrogen or $C_{1-4}$ alkyl. Suitable catalysts according to the invention include, for example, N-(2-aminoethyl) pyrrolidine, N-(2-(methylamino)ethyl)pyrrolidine, N-(3-aminopropyl)-pyrrolidine, N-(3-methylamino)propyl) pyrrolidine, N-(3-(ethylamino)propyl)pyrrolidine, N-(3-(propylamino)propyl)pyrrolidine, N-(4-aminobutyl) pyrrolidine, N-(3-amino-2-methylpropyl)-pyrrolidine, and N-(3-methylamino-2-methylpropyl)pyrrolidine. Preferred catalysts include N-(3-aminopropyl)pyrrolidine, N-(3-methylamino)propyl)prrolidine, N-(3-(ethylamino)propyl)-pyrrolidine, and N-(3-(propylamino)propyl)pyrrolidine, with N-(3-aminopropyl)pyrrolidine and N-(3-(methylamino)propyl)-pyrrolidine being particularly preferred.

The isocyanate-reactive compounds which are used as component (b) in the process accordin9 to the invention are those used in previously known processes for the preparation of polyurethanes and are described, for example, in Kunststoffhandbuch, Vol. VII, Polyurethane, Hansen-Verlag, Munich (1963) or in Houben-Weyl, Makromolekulare Stoffe Vol. E 20. The isocyanate reactive compounds have a molecular weight $M_n$ of 3000–10000, preferably 3000–6000, e.g. polyether-polyols such as Bayfit®3973 or Bayfit®3963 (commercial product Bayer AG).

The compounds containing NCO groups used as component (a) in the process of the invention are the same compounds used in previously known processes and are described, for example, in Kunststoffhandbuch, Vol. VII, Polyurethane, Hansen-Verlag, Munich (1983) or in Houben-Weyl, Makromolekulare Stoffe, Vol. E20.

When carrying out the process according to the invention, the substituted pyrrolidines are used in the same way as the previously known catalysts. For example, the catalyst may be used in its liquid form or may be dissolved in a polyol or a suitable solvent. The catalyst may be used at any temperature - or under other conditions - either alone or in combination with other known catalysts that are suitable for the preparation of polyurethanes. Suitable other catalysts include organic or inorganic tin compounds or other organometallic compounds; tertiary amines, alkanolamines, cyclic amines, polyamines, and the like; alkali metal compounds; and other co-catalysts.

The catalysts according to the invention are preferably used in a quantity of at least 50% by weight, based on the total quantity of catalyst used.

The process according to the invention is suitable for conventional production methods, including, for example, one-shot or prepolymer processes for the preparation of polyurethane foams, polyurethane elastomers, polyurethane coatings, and the like, and for the crosslinking reaction which is often desirable after the direct polyaddition.

All other conditions are the same as those used in conventional urethane polyaddition processes. In each case, other known additives may be used, including chain-extending agents, blowing agents, foam stabilizers, emulsifiers, dyes, pigments, and fillers.

The above-mentioned catalysts of the invention accelerate the polyaddition reaction to a considerable extent so that the quantity of catalyst required is very small. Because the catalyst compounds according to the invention have only a faint odor and because they represent substantially nonvolatile liquids and incorporable compounds, the polyurethane products obtained are free from unwanted odors.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Examples 1 to 6

These Examples demonstrate the high catalytic activity of N-(3-aminopropyl)pyrrolidine and N-(3-methylamino) propyl)pyrrolidine in comparison with analogous catalysts which do not contain a pyrrolidine ring in a polyurethane cold-cure flexible foam system.

The following catalysts were used:

Catalyst 1: N-(3-aminopropyl)piperidine
Catalyst 2: N-(3-aminopropyl)-N'-methylpiperazine
Catalyst 3: 3-dimethylaminopropylamine
Catalyst 4: N-(3-aminopropyl)pyrrolidine
Catalyst 5: N-(3-(methylamino)propyl)pyrrolidine The catalysts have the following formulas:

1

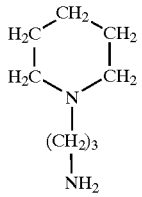

2

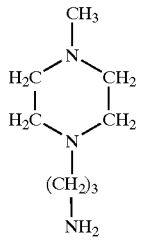

3

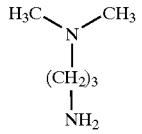

4

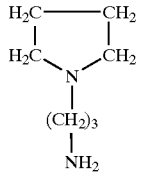

-continued

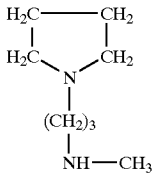

Catalysts 4 and 5 correspond to the invention, with the other catalysts being comparison catalysts.

| | |
|---|---|
| Component A: | |
| 37.10 parts | mixture of 80% 2,4-toluene diisocyanate and 2,6-toluene diisocyanate (in a ratio of 80:20) and 20% 4,4'-diisocyanatodiphenylmethane with polymeric components (NCO content 44.5 ± 0.5% by weight) (Desmodur ® VT 06, a commercial product of Bayer AG) |
| Component B: | |
| 100.00 parts | polyether polyol (OH value 28 ± 2 mg KOH/g) prepared by reaction of trimethylolpropane (TMP) with propylene oxide (PO) and subsequent reaction with ethylene oxide (EO) in a PO:EO ratio of 82:18 |
| 3.00 parts | water |
| 0.05 part | 70% solution of bis(2-dimethylaminoethyl) ether in dipropylene glycol (DPG) |
| 0.25 part | 33% solution of diazabicyclo[2.2.2]octane (DABCO) in DPG |
| 0.20 part | foam stabilizer B4617 (Goldschmidt AG) |
| 0.80 part | polyether polysiloxane as stabilizer (Stabilisator IS 50, a product of Bayer AG) |
| 0.6 part | catalyst 1 to 5 |

Component A is combined with component B and the mixture is thoroughly mixed for 6 seconds using a high-speed stirrer. The reaction mixture is then foamed in an open mold at room temperature.

The results obtained with the various catalysts are set out in Table 1.

TABLE I

| Example | Catalyst | Cream time (sec) | Gel time (sec) | Rise time (sec) |
|---|---|---|---|---|
| 1 | None | 9 | 108 | 213 |
| 2 | 1 | 9 | 105 | 210 |

TABLE I-continued

| Example | Catalyst | Cream time (sec) | Gel time (sec) | Rise time (sec) |
|---|---|---|---|---|
| 3 | 2 | 8 | 75 | 150 |
| 4 | 3 | 7 | 52 | 115 |
| 5* | 4 | 6–7 | 48 | 100 |
| 6* | 5 | 4–5 | 46 | 93 |

*Examples according to the invention

Foams having a satisfactory foam structure were obtained.

What is claimed is:

1. A process for preparing a polyisocyanate polyaddition product comprising reacting (a) a polyisocyanate with (b) a relatively high molecular weight compound containing at least two isocyanate-reactive hydrogen atoms and (c) a chain-extending agent, in the presence of (d) an N-(aminoalkyl)pyrrolidine catalyst corresponding to the formula

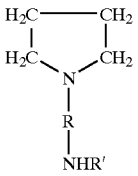

in which

R is a $C_{2-12}$ alkylene group (optionally containing O or N atoms but not isocyanate-reactive groups) and R' is [hydrogen or] a $C_{1-4}$ alkyl group, (e) optionally, other known catalysts, and (f) other known additives.

2. A process according to claim 1 wherein R is a 1,3-propylene group and R' is [hydrogen or] $C_{1-4}$ alkyl group.

3. A process according to claim 1 wherein the N-(aminoalkyl)pyrrolidine catalyst is N-(3-aminopropyl) pyrrolidine and N-(3-(methylamino)propyl)pyrrolidine.

4. A process according to claim 1 wherein the polyisocyanate polyaddition product is a cellular plastic.

* * * * *